United States Patent
Weischedel et al.

[15] 3,676,800
[45] July 11, 1972

[54] SYNCHRONIZED SELF-OSCILLATING SWITCHING REGULATOR

[72] Inventors: Herbert Rudolf Weischedel, Rockaway; George Raymond Westerman, Denville, both of N.J.

[73] Assignee: Bell Telephone Laboratories, Incorporated, Murray Hill, N.J.

[22] Filed: Dec. 24, 1970

[21] Appl. No.: 101,344

[52] U.S. Cl..............................331/111, 323/22 T, 331/183
[51] Int. Cl. .........................................................H03b 3/02
[58] Field of Search...................323/DIG. 1, 17, 22; 331/113, 331/111, 183

[56] References Cited

UNITED STATES PATENTS 3,328,674  6/1967  Bleicher............................323/DIG. 1
3,577,065  5/1971  Putzrath............................323/DIG. 1

OTHER PUBLICATIONS

Solid State Design, R. D. Loucks, Pgs 30– 34 Apr. 1963

*Primary Examiner*—John Kominski
*Attorney*—R. J. Guenther and E. W. Adams, Jr.

[57] ABSTRACT

A periodic synchronizing signal of constant frequency is coupled to the feedback loop of a self-oscillating switching regulator to hold the switching frequency constant. The synchronizing signal is added directly to the feedback signal to drive the switch ON and OFF. The waveform of the synchronizing signal is not critical; a relaxation oscillator and a resonant circuit shock excited by the switching are shown as synchronizing signal sources.

6 Claims, 4 Drawing Figures

Patented July 11, 1972

INVENTORS H. R. WEISCHEDEL
G. R. WESTERMAN

BY

*Joseph A Cameron*

ATTORNEY

3,676,800

SYNCHRONIZED SELF-OSCILLATING SWITCHING REGULATOR

BACKGROUND OF THE INVENTION

This invention relates to switching type voltage regulators, and more particularly to self-oscillating switching voltage regulators.

Since the advent of semiconductor devices that can switch relatively high currents quickly and efficiently, the switching type voltage regulator has become extremely popular. It is very effective in regulating voltage, and at the same time it is simple, efficient, reliable and inexpensive. It operates by continually switching between its cut-off and saturated states a semiconductor device connected between input and output. As a consequence, it generates considerable ripple that usually must be filtered.

The simplest type of switching regulator is the self-oscillating type. When the power source is connected, the switch is closed, connecting the source to the load. This raises the voltage at the regulator output. When the output voltage rises above a predetermined level, the switch is opened, disconnecting the power source from the output. When the output voltage subsequently falls below a second predetermined level, the switch is reclosed to again raise the output voltage. The regulation of this circuit is very fast, for the switch stays open or closed long enough to compensate immediately for any sudden transient in line or load. For the same reason, however, the switching frequency varies greatly with changes in line and load. Such frequency variation makes effective filtering more expensive and difficult and decreases efficiency. In addition, if the switching frequency drops into the audible range, a very annoying noise can be generated.

The driven switching regulator overcomes these particular disadvantages by operating at the constant frequency of a driving oscillator. This type regulator, however, requires a pulse width modulator of some type in order to provide the regulation. Since the switch is turned ON at regular intervals by the driving oscillator, it must be turned OFF after a time interval that is related to output voltage. The result is a more complicated and expensive regulator. Furthermore, in the absence of signals from the driving oscillator, the regulator stops.

An object of this invention is to control the switching frequency of a self-oscillating switching regulator.

A second object is to synchronize a self-oscillating switching regulator to an external oscillator.

A third object is to provide a switching regulator of substantially constant frequency that continues to operate in the absence of a driving signal.

SUMMARY OF THE INVENTION

This invention utilizes a self-oscillating switching regulator that includes a feedback loop of sufficient gain and phase shift connected between the output terminals and the switching means to sustain self-oscillation in the switching made. A source of periodic synchronizing signals of substantially constant frequency and sufficient amplitude is coupled to the feedback loop to hold the switching frequency and the voltage at the output terminals substantially constant.

DETAILED DESCRIPTION

Figure 1:
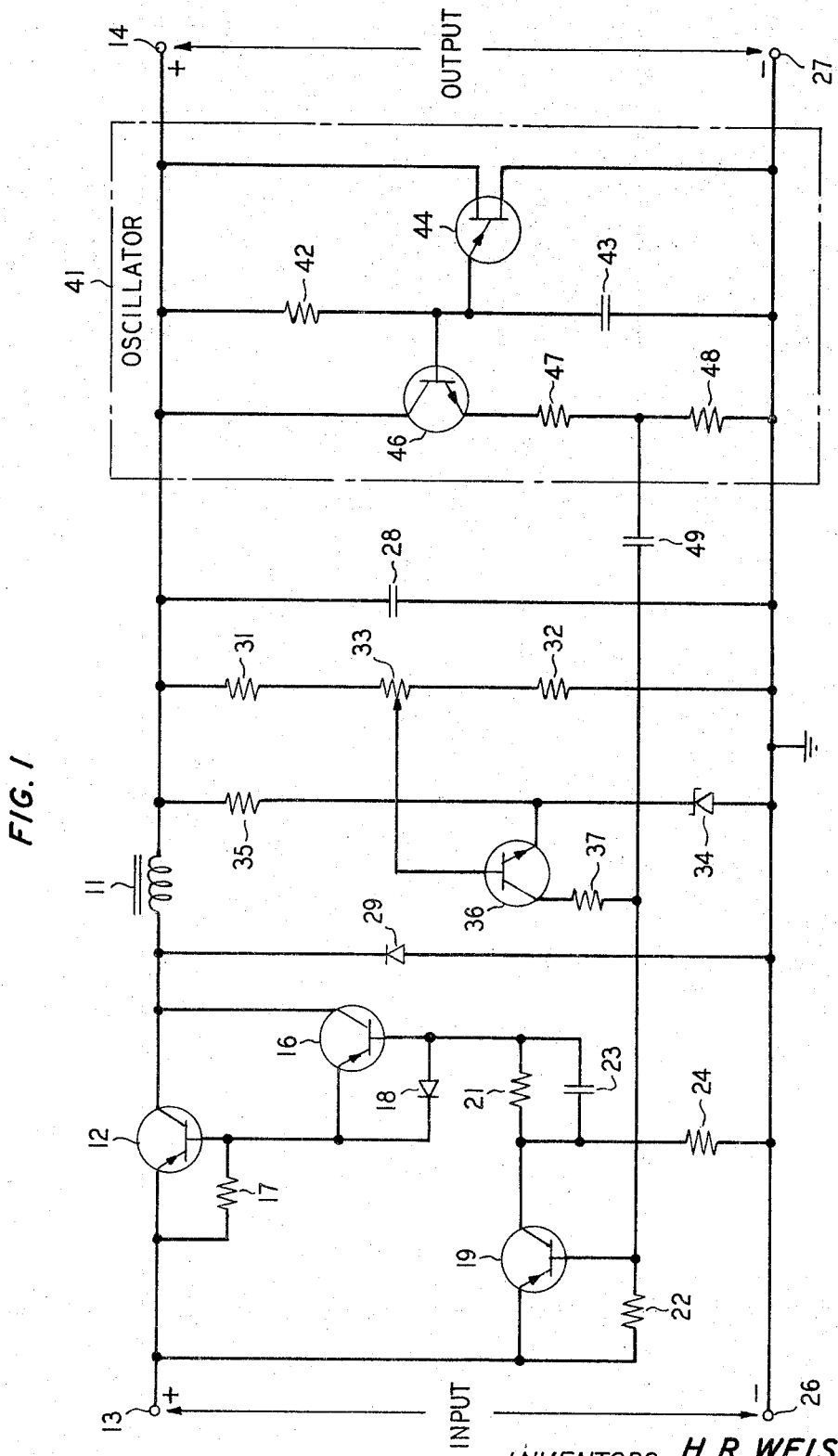
FIG. 1 is a schematic diagram of a useful embodiment of the invention.

In the self-oscillating switching regulator of FIG. 1, the series combination of an inductor 11 and the emitter-collector path of a switching transistor 12 is connected between a positive-input terminal 13 and a positive-output terminal 14. The emitter-collector path of a second transistor 16 is connected between the base and collector of switching transistor 12 in the well known Darlington fashion. A biasing resistor 17 is connected between emitter and base of transistor 12, and a diode 18 is connected across the emitter-base junction of transistor 16 poled in opposite polarity, to that junction. The series combination of the emitter-collector path of a driver transistor 19 and a resistor 21 is connected between input terminal 13 and the base of transistor 16. A biasing resistor 22 is connected between emitter and base of driver transistor 19; a capacitor 23 shunts resistor 21; and a resistor 24 connects the collector of transistor 19 to the other input terminal 26, which in turn is directly connected to the other output terminal 27.

These parts form the switching portion of the regulator, the operation of which is straightforward. The application of a positive voltage to input terminal 13 forward biases transistors 12 and 16, turning them ON and providing current output at terminal 14. The base current of transistor 16 passes through resistors 21 and 24. Capacitor 23 charges to the voltage drop across resistor 21, with the end connected to resistor 24 more negative. A subsequent negative voltage applied to the base of driver transistor 19 turns transistor 19 ON. The voltage across capacitor 23 is applied to the base of transistor 16 and, by way of diode 18, to the base of transistor 12. This positive voltage turns OFF transistors 12 and 16.

A capacitor 28 is connected between output terminals 14 and 27 to form together with inductor 11 a low pass filter, and diode 29 is connected between the collectors of transistors 16 and 12 and the common or ground lead between input 26 and output 27. Diode 29 is poled to block current from transistors 12 and 16 during the half of the cycle when those transistors are conducting and, when the transistors are not conducting, to supply current to output terminal 14 driven by energy stored in inductor 11.

In order to sustain oscillation and at the same time provide regulation, the circuit of FIG. 1 also includes a feedback circuit with an error detector. A voltage divider comprising the series combination of two resistors 31 and 32 and a potentiometer 33 is connected across output terminals 14 and 27. Also connected in series across the output terminals are a resistor 35 and a zener diode 34. The value of resistor 35 is chosen according to usual practice to keep zener diode 34 operating in its breakdown range as a constant reference voltage source. The base of an error detector transistor 36 is connected to the tap of potentiometer 33; the emitter of transistor 36 is connected to the cathode of diode 34; and the collector of transistor 36 is connected through a resistor 37 to the base of driving transistor 19.

The operation of the feedback circuit is also straightforward. When transistor 12 turns ON, it supplies a current to output terminal 14, charging capacitor 28. A portion of the voltage across capacitor 28 as selected by potentiometer 33 is applied to the base of transistor 36, whose emitter is held at the constant potential of zener diode 34. When the base voltage of transistor 36 rises above the breakdown potential of zener diode 34, it causes an increase in that transistor's collector current, which is supplied from input terminal 13 through resistors 22 and 37. The increase in current through resistor 22 biases the base of transistor 19 more negative to cause more current to flow through the collector of transistor 19 and resistor 24 to ground. This in turn, as previously mentioned, raises the voltage of the bases of transistors 12 and 16 to the point where they are turned OFF. Although transistors 12 and 16 are cut off, a decaying current continues to flow for a portion of the cycle through diode 29 and inductor 11 into capacitor 28 and the load driven by the energy stored in inductor 11. The output voltage, that is, the voltage across capacitor 28, reaches its peak and begins to decay. When output voltage decays to the point that the base of error detector transistor 36 is less positive than its emitter, transistor 36 turns OFF to turn off transistor 19. This in turn causes switching transistor 12 to turn ON again. If there is sufficient gain produced by transistors 36 and 19, transistor 12 may be switched ON and OFF with only millivolts of output ripple. With no more additional parts, therefore, the circuit would continue to oscillate. Furthermore, since the switching transistor is turned OFF through the driving transistor and the error detector transistor in response to a predetermined output voltage level, the circuit would continue to regulate. Any momentary increase in output voltage would switch OFF the switching transistor more rapidly, and any momentary decrease would keep the switching transistor ON for a longer period. By the same token, of course, the frequency of the regulator would vary considerably with changes in input voltage or load.

The circuit of FIG. 1, however, according to the principles of the invention, includes an additional oscillator 41 capacitively connected to the base of driver transistor 19. Oscillator 41 includes a unijunction transistor-relaxation oscillator stage and an emitter-follower output stage. An RC timing circuit comprising a resistor 42 and a capacitor 43, is connected across output terminals 14 and 27. Also connected across output terminals 14 and 27 are the two bases of unijunction transistor 44. The emitter of unijunction transistor 44 is connected to the junction between timing resistor 42 and timing capacitor 43. Capacitor 43 charges through resistor 42 until it reaches the breakdown potential of unijunction transistor 44. At that point, the unijunction transistor fires, rapidly discharging capacitor 43 until the unijunction current falls below the minimum required sustaining current. The unijunction transistor turns OFF, and the charging cycle starts again. The voltage waveform across capacitor 43 is of sawtooth shape, typical of relaxation oscillators.

The emitter-follower stage comprises the base-emitter junction of a transistor 46 and two resistors 47 and 48 connected in series across capacitor 43. The collector of transistor 46 is connected to output terminal 14, and the junction between resistors 47 and 48 is connected through a blocking capacitor 49 to the base of transistor 19. Resistors 47 and 48 form a voltage divider to apply the proper amplitude of synchronizing voltage from oscillator 41 to the base of transistor 19. The synchronizing voltage and the feedback voltage output of the error detector are added together across resistors 22 and 37, so that the driving voltage applied to transistor 19 is the sum of these two voltages. It has been found that this combination operates to lock the switching frequency of the regulator to that of the oscillator without disturbing the regulation. A relaxation oscillator with its sawtooth waveform was used in the circuit of FIG. 2 mainly because of its low cost and simplicity. Most common waveforms, with the exception of rectangular will provide the necessary synchronization and regulation. One of the waveforms that can easily achieve proper synchronizing over a wide range of conditions is an approximate sine wave.

Figure 2:
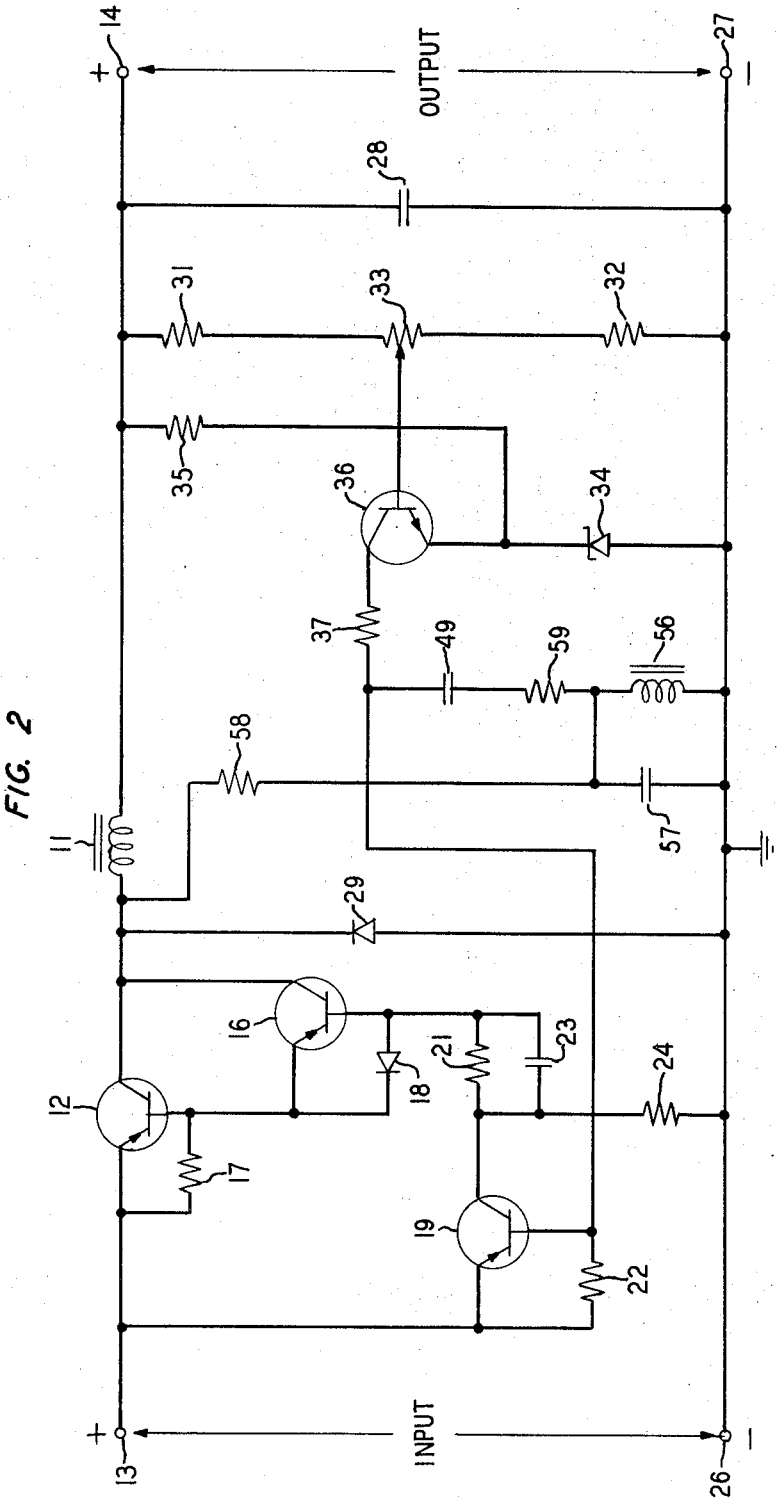
FIG. 2 is a schematic diagram of an alternative useful embodiment.

A simple circuit that utilizes an approximate sine wave synchronizing signal to practice the invention is shown in FIG. 2. This circuit is very similar to that of FIG. 1, and corresponding components are numbered the same. Here, however, a shock excited resonant circuit is used as a source of synchronizing signals in place of oscillator 41. The parallel combination of an inductor 56 and a capacitor 57 is connected in series with a resistor 58 between the common ground and the collectors of transistors 12 and 16. The values of inductors 56 and capacitor 57 are chosen to resonate at the desired switching frequency. A resistor 59 connects the junction of inductor 56 and resistor 58 to coupling capacitor 49 to provide the synchronizing signal output. The value of resistor 59 is chosen with respect to that of resistor 37 to provide the desired amplitude of synchronizing voltage. This circuit has the advantage of simplicity in that a separate oscillator is not required.

Figure 3:
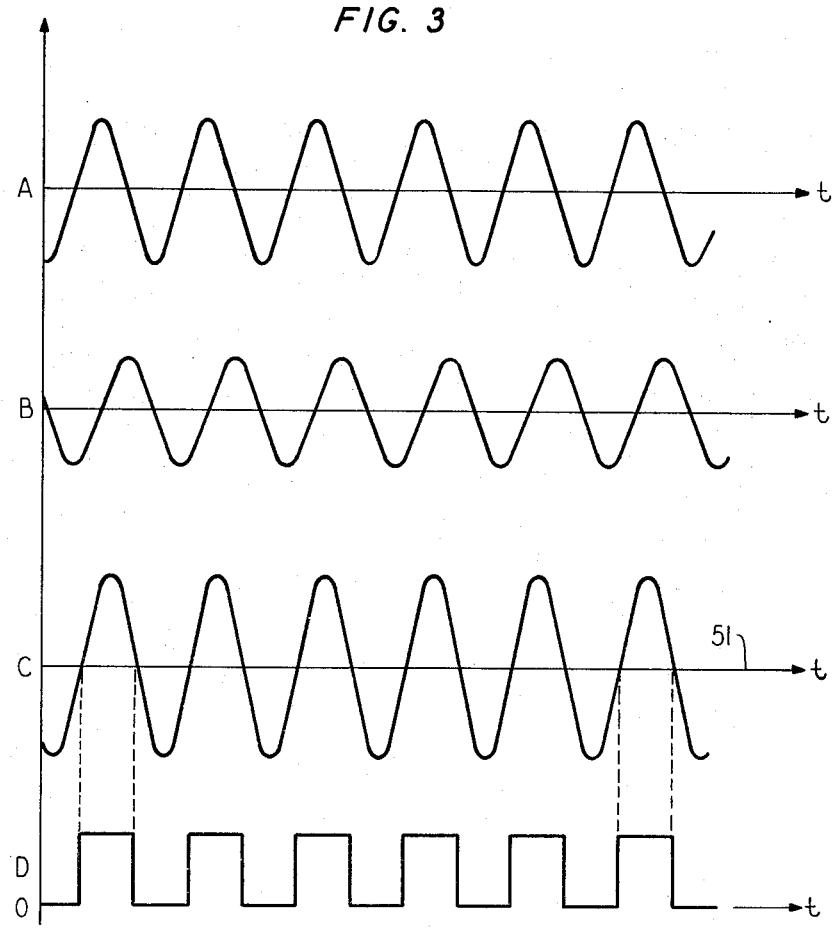
FIG. 3 is a series of waveforms useful to explain the operation of the invention.

Some of the voltages of the circuit of FIG. 2 are plotted in FIG. 3 as an aid to understanding the operation of the invention. Curve A of FIG. 3 represents the synchronizing voltage waveform as applied to capacitor 49. Curve B represents the output of error detector 36. It is a replica of the ripple that appears at output terminal 14 amplified and reversed in phase by the error detector transistor, and with the DC level subtracted by reference voltage source zener diode 34. These two voltages represented by curves A and B, are added across resistor 37 to produce the sum voltage that is represented by curve C. This sum voltage is the driving voltage as applied to the base of transistor 19. The critical points on curve C are those where the driving voltage crosses the switching level 51. At these switching points, transistor 12 is turned ON and OFF as shown by idealized switching voltage waveform curve D. For simplicity, the switching level of curve C is shown equal and constant for positive-going and negative-going signals. In practice, these two may differ, but because of the high gain of transistor 19, the difference is not great.

It will be noticed that the duty cycle of curve D is approximately 50 percent. As the output voltage tends to increase, the output of error detector 36, curve B, tends to shift downward because the change in dc level is inverted by the one amplifier stage. This in turn causes curve C to shift downward, shortening the length of time curve C is above the switching level, hence the duty cycle. The regulation therefore continues without a change in frequency.

It will also be noted that the curves show a relatively large amplitude of synchronizing voltage, more ore less commensurate with the feedback ripple voltage. The ripple voltage itself is, of course, very small compared to output voltage. Surprisingly, the amplitude of the synchronizing signal is not at all critical in achieving these results. The closer the free-running frequency of the regulator is to that of the oscillator, the less synchronizing voltage is required. In a practical case, when the two design frequencies are approximately the same, a synchronizing voltage amplitude that is a very small fraction of the feedback ripple amplitude is completely effective. Yet, when the two voltages are of comparable amplitude, operation is still satisfactory. In the limit, of course, there is a minimum amplitude for the synchronizing voltage, below which the regulator will not synchronize. Likewise, if the synchronizing voltage amplitude is so large as to swamp out the feedback signal, regulation will be impaired.

Figure 4:
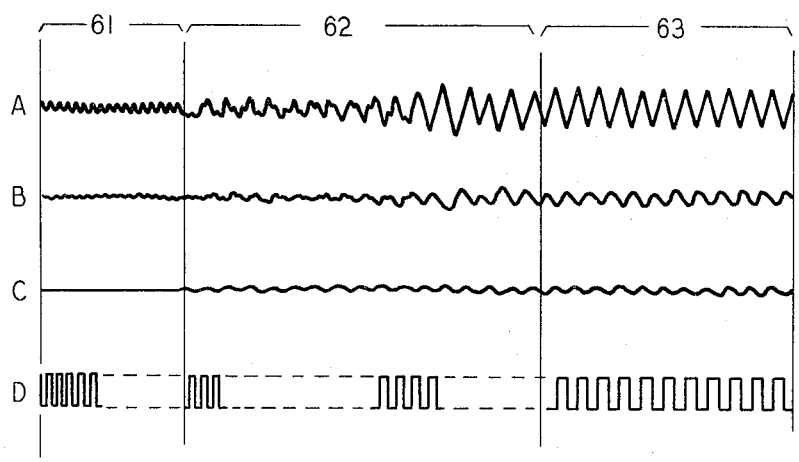
FIG. 4 is a series of waveforms illustrating the operation at the threshold of synchronism.

FIG. 4 illustrates the operation as the synchronizing signal is increased in amplitude from zero. In this figure, curve A represents the current through inductor 11, curve B the feedback voltage taken from the collector of error detector resistor 36, curve C the synchronizing signal applied from an external oscillator, and curve D the switching voltage taken from the collector of transistor 12. In region 61, there is no synchronizing voltage applied and the switching regulator consequently operates in its unrestrained self-oscillating mode. In region 62, as the synchronizing signal amplitude is slowly increased, the regulator attempts to operate at both frequencies, that of its free-running mode, and that of the applied synchronizing signal. The result is an oscillation in a discrepancy mode which is rather erratic. Finally, in region 63, the synchronizing signal amplitude is sufficient to cause full synchronization of the switching, and the frequency is locked to that of the synchronizing signal. Because of the large difference between the free-running frequency and the synchronizing frequency, a relatively large synchronizing signal is required of the same order of magnitude as the output ripple. The regulation under these conditions is not impaired, however.

In summary, therefore, by adding a constant frequency oscillator signal to the feedback signal of a self-oscillating switching voltage regulator according to the principles of the invention, we have produced a voltage regulator that is almost as simple as a conventional self-oscillating regulator, but whose frequency is fixed and constant. Effective pulse width modulation is achieved without the expense of a separate pulse width modulator. Since the sum of the feedback signal and the oscillator signal operates to turn the switch ON and OFF, the fast regulation of the self-oscillating regulator is maintained; the switch continues to remain in its open or closed position long enough to compensate for a transient in voltage or load.

Since very little oscillator voltage and power are required, and synchronism can be achieved over a wide range of oscillator voltage and frequency, a single oscillator can easily serve to synchronize several self-oscillating regulators to a single constant frequency. Finally, if the oscillator signal is interrupted for any reason, the regulator continues to put out a regulated voltage although, drifting in operating frequency.

What is claimed is:

1. A constant frequency switching regulator comprising a pair of input terminals for connection to a dc source, a pair of output terminals for connection to a dc load, switching means connected to said input and said output terminals for intermittently connecting at least one of said input terminals to at least one of said output terminals, a feedback loop connected between said output terminals and said switching means for driving said switching means to open and close in response to the voltage at said output terminals, said feedback loop including sufficient gain and phase shift to sustain self-oscillation in the switching of said switching means, and a source of periodic synchronizing signals of substantially constant frequency and sufficient amplitude coupled to said feedback loop to hold the switching frequency of said switching means and the voltage at said output terminals substantially constant.

2. A constant frequency switching regulator as in claim 1 wherein said source of periodic synchronizing signals derives its energy from said dc source through said switching means.

3. A constant frequency switching regulator as in claim 1 wherein said source of periodic synchronizing signals is a relaxation oscillator.

4. A constant frequency switching regulator as in claim 1 wherein the feedback signal in said feedback loop and the synchronizing signals from said source of periodic synchronizing signals are added to drive said switching means.

5. A constant frequency switching regulator as in claim 4 wherein said synchronizing signals are capacitively coupled to said feedback loop.

6. A constant frequency switching regulator as in claim 2 wherein said source of periodic synchronizing signals is a shock-excited resonant circuit.

* * * * *